Sept. 28, 1971    J. H. KOCH    3,608,222
BACK LIGHTED PANEL
Filed Oct. 22, 1968    4 Sheets-Sheet 1

INVENTOR.
JOHN H. KOCH
BY
William S. Dorman
ATTORNEY

Sept. 28, 1971 J. H. KOCH 3,608,222
BACK LIGHTED PANEL
Filed Oct. 22, 1968 4 Sheets-Sheet 2

INVENTOR.
JOHN H. KOCH
BY
William S. Dorman
ATTORNEY

Sept. 28, 1971   J. H. KOCH   3,608,222
BACK LIGHTED PANEL
Filed Oct. 22, 1968   4 Sheets-Sheet 3

INVENTOR.
JOHN H. KOCH
BY
William S. Dorman
ATTORNEY

United States Patent Office 3,608,222
Patented Sept. 28, 1971

3,608,222
BACK LIGHTED PANEL
John H. Koch, P.O. Box 11, Williamsville, N.Y. 14221
Filed Oct. 22, 1968, Ser. No. 769,694
Int. Cl. G09f 13/06
U.S. Cl. 40—130E
3 Claims

ABSTRACT OF THE DISCLOSURE

A back lighted panel having a cellular or "egg crate" structure supported on and spaced from a front translucent display panel or face in a manner substantially precluding shadows or other interruptions in the illustrative matter applied to or provided on the front display face. Removable support members are provided which may be disposed at substantially any desired spacing in the cellular structure for engaging the front face to facilitate retaining the cellular structure in the spaced relation with respect thereto and for substantially precluding warping or distortion of the front face. In addition, inserts are provided for the cellular structure which may be utilized to facilitate the channeling of light onto the illustration face in a more facile manner than heretofore possible. Furthermore, illustration inserts are provided which may in and of themselves be utilized in combination with the cellular structure and the translucent face for building or constructing a lighted illustrative system on the said illustration face.

---

This invention relates to improvements in back lighted panel structures and more particularly but not by way of limitation to a back lighted panel structure particularly designed and constructed for facilitating mounting of a cellular structure in a spaced relationship with the illustrative panel portion of a display device in a manner substantially eliminating undesirable shadows, and to facilitate channeling of light to the illustration surface.

In back lighted panel structures, such as utilized in many training courses, for display purposes, or the like, it is the usual practice to support a lighting structure behind a display face or sheet in such a manner that light is directed to and through the display face. This display face is usually provided with an opaque surface having only those portions thereof open or transparent for letting light through which is necessary to provide the desired illustrative effect. The rear structure for supporting the lights is usually a cellular structure of a generally egg crate configuration including a plurality of cells each for engaging or receiving a bulb as required to provide the desired lighting effect. Of course, the egg crate structure must be supported from the display face in some manner, and several of my own prior patents relate to this type structure, such as Pat. No. 2,952,079, issued Sept. 13, 1960, and entitled "Training Panel Assembly"; and 2,985,968, issued May 30, 1961, and entitled "Display Device and Method for Making the Same"; Pat No. 3,180,774, issued Apr. 27, 1965 and entitled "Method for Making Display Device." In addition, the C. R. Mitchell Pat. No. 3,025,-613, issued Mar. 20, 1962, and entitled "Display Device" discloses a back lighted panel of the cellular structure type representative of these display devices presently in use. These structures have several disadvantages in that undesirable shadows are cast on the display panel surface which interfere with the illustrative material thereon. In an effort to overcome this disadvantage, a cellular structure was developed wherein a plurality of arches were provided in the walls of the cells, as shown in my prior Pat. No. 3,040,444, issued June 26, 1962, and entitled "Display Panel Assembly." However, this structure results in a pattern of shadows on the display panel face, which is also a disadvantage. In addition, the cellular or egg crate structure presently in use normally bonds the cellular structure to the display panel or translucent "face plate," and the bonding material yellows with age and hinders the transfer of light through the translucent material. It has also been found in use that the heat of the light bulbs behind the display panel frequently tends to warp or distort the panel and this creates severe local light shadows, poor density and uneven lighting.

The present invention contemplates a novel back lighted structure wherein the cellular or egg crate member is spaced from the display panel and supported therefrom in a manner whereby physical contact between the egg crate structure per se and the display panel is eliminated. Support members extend between the panel and the cellular member in a manner substantially eliminating unwanted shadows on the exposed or illustrative face of the display panel. In addition, removable support posts may be spaced on the cellular structure and engage the display panel in a manner substantially precluding distortion or warping of the display board. Furthermore, independent insert members are provided for "damming" certain portions wherein it is desired to restrict the passage of light, or channel the light, through the display panel. These dam inserts may be readily installed or removed as required in accordance with the desired light pattern for the device. It is further anticipated that independent illustration insert members having at least one closed end having a predetermined or preselected pattern for lighting thereon may be removably installed in the cellular structure in such a manner and with proper relation to the display panel as to facilitate assembly of a lighted display or training pattern on the face of the panel. It is preferable that the closed end portion of each insert be removable in order to facilitate altering of the lighting pattern thereon, thus providing a substantially infinite number of lighting patterns to enable the quick assembly of a lighted training panel or lighted illustration board of any desired type and substantially any desired size.

It is an important object of this invention to provide a novel back lighted panel particularly designed and constructed for substantially eliminating undesirable shadow patterns on the illustration face of a display panel structure.

Another object of this invention is to provide a back lighted panel of the modular or cellular type wherein the channeling of light to and through the display panel face is greatly facilitated in all areas thereof.

Still another object of this invention is to provide a back lighted panel of the cellular type wherein undue distortion or warping of the plane of the illustrative panel face is substantially eliminated.

A further object of this invention is to provide a novel back lighted panel wherein a lighted illustration or display may be quickly and easily created for training or illustrative purposes.

Other and further objects and advantageous features of the present invention will hereeinafter more fully appear in connection with a detailed description of the drawings in which.

Figure 1:
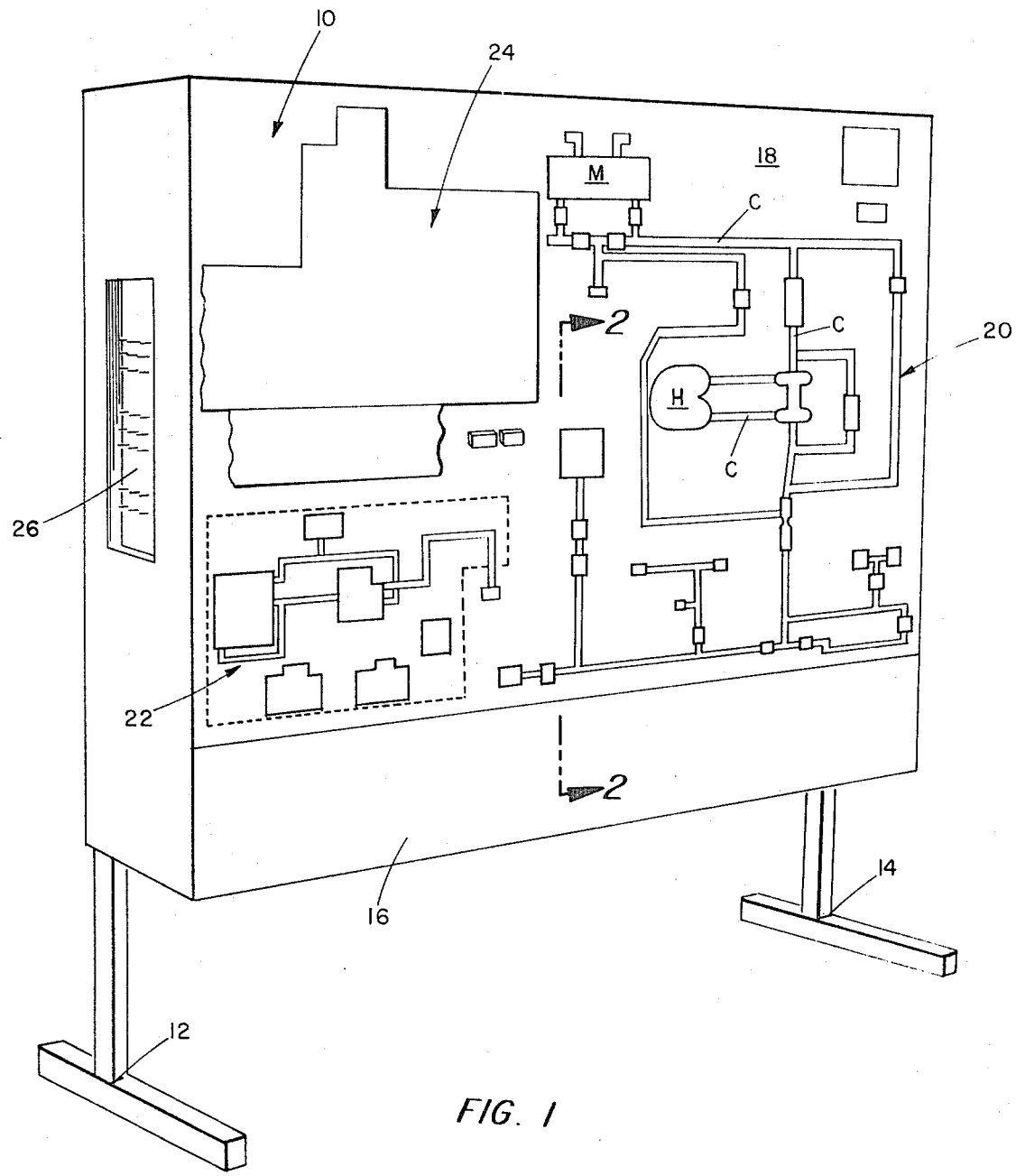
FIG. 1 is a perspective view of a back lighted panel illustrating a general type of structure in combination with which the present invention may be utilized.

Referring to the drawings in detail, reference character 10 generally indicates a back lighted display or training panel such as may be utilized in combination with the invention. The panel structure 10 as shown in FIG. 1 comprises a pair of spaced support legs 12 and 14 supporting a substantially rectangular housing 16 having a translucent display panel or face plate 18 mounted thereon in any suitable manner (not shown). The face plate 18 is of a translucent or semi-transparent construction, as will be hereinafter set forth. Whereas the illustration or display depicted on the face plate 18 may be of any desired or suitable type, that depicted in FIG. 1 broadly relates to an air conditioning-pressurization-bleed air system in an aircraft, and comprises a first portion 20 relating to the bleed air system, and a second portion 22 relating to a pressurization control system. In addition, a third portion 24 is included which may contain a representation of the aircraft instrumentation for clarification or training purposes in combination with the sections 20 and 22.

In the bleed air system section 20, the plurality of system components, such as the mixing chamber M, heat exchanger H, and the like, are interconnected by suitable pathways or indicated channels C, and the components and channels may be selectively lighted in accordance with the flow of fluid, or the like, through the system for facilitating teaching or illustration thereof, as is well known. Similarly, the presurized control system section 22 is provided with components interconnected by passageways or channels which may be selectively lighted to visually illustrate the operation thereof. The lighting effects are achieved from backlighting of the panel face 18 in the manner as will be hereinafter set forth. Of course, a suitable control panel 26 may be provided in the housing 16 for facilitating electrical control of the back lighting system, as is well known.

Figure 2:
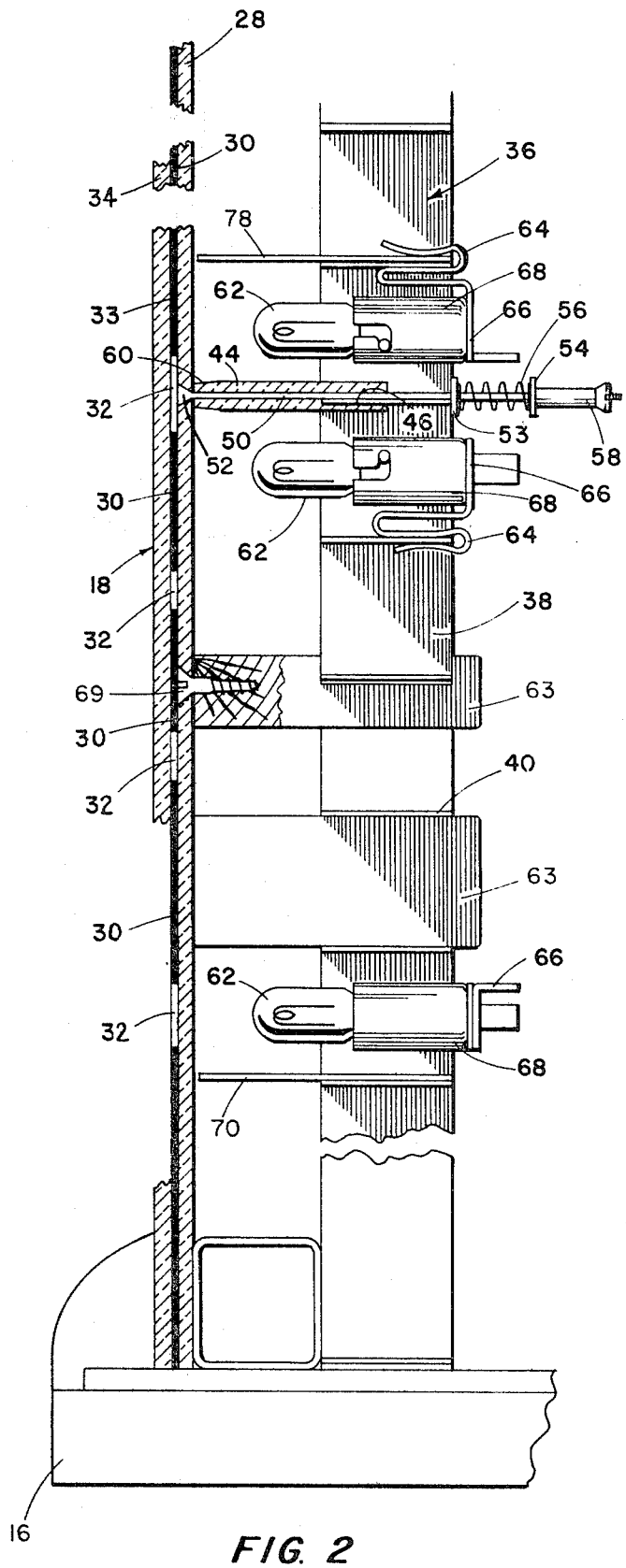
FIG. 2 is a broken elevational view taken on line 2—2 of FIG. 1.

Referring now to FIGS. 2 through 7, the means for providing back lighting for the panel 18 is shown in detail. Whereas the panel 18 may be of any suitable type construction, as shown in FIG. 2 the panel 18 is of a translucent or semi-transparent construction comprising a translucent or transparent sheet or plate 28 selectively opaqued as indicated at 30 and transparent at selected portions 32 whereby light is permitted to flow through the panel 28 only at those transparent portions 32. The design thus provided on the panel 28 may be hidden, if desired, by the addition of a semi-transparent face sheet 34 which may be secured thereto in any well known manner not shown. In this type of construction the illustration or schematic teaching content (subject of display) which is provided on the panel 28 by the illustrative opaquing 30 and transparent portions 32 may be revealed as needed with selected lighting as is well known. Of course, the face plate 34 may be eliminated or omitted if desired, whereby the panel 18 consists merely of the plate 28 having a selected opaquing 30 and transparent portions 32 provided thereon. Alternatively, the panel 18 may comprise only a translucent, semi-translucent, or transparent face 28, only with no preselected panel or opaquing whatsoever provided thereon. This construction is particularly desirable in combination with insert elements of the present invention as will be hereinafter set forth.

A cellular support member generally indicated at 36 is disposed in substantially coplanar alignment with the panel 18 and is spaced therefrom in a manner as will be hereinafter set forth. The cellular or "egg crate" member 36 comprises a plurality of substantially parallel spaced strips 38 extending in one direction and a plurality of similar parallel and spaced strips 40 arranged in perpendicular relationship with respect to the strips 38 to provide a plurality of substantially square or rectangular cells 41 having the opposite ends thereof open. The strips 38 and 40 are intersecting as particularly shown in FIGS. 3 through 7 and may be secured together in any well known manner. In the present instance, it is preferable to provide each strip 38 with a plurality of longitudinally spaced slits (not shown) extending substantially half the depth of the strip and to similarly provide each strip 40 with a plurality of longitudinally spaced slits (not shown) extending substantially half the depth thereof in an opposite direction from the slits in the strips 38. The strips 38 and 40 may be interconnected or joined together by placing the respective slits in substantial alignment and inserting one strip within the slit of the other strip. Of course, this type of construction is well known and there is no limitation to this type of construction for the egg crate 36.

Figure 3:
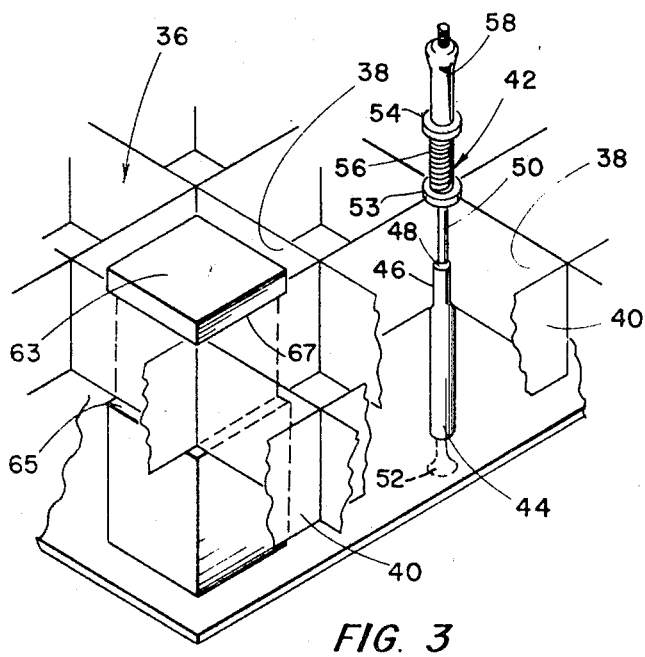
FIG. 3 is a perspective view of a portion of a display panel and cellular element particularly illustrating the supporting means for the cellular element.
Figure 7:
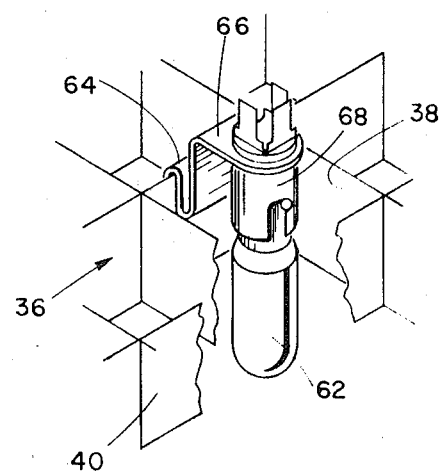
FIG. 7 is a broken perspective view of a cellular member embodying the invention and illustrating one type of support for a light bulb.

The egg crate 36 is spaced from and secured to the panel 18 by means of a plurality of spaced support members 42 (FIG. 3). The number of supports 42 required depends, of course, on the overall size of the panel structure 18. Each support post or member 42 comprises a sleeve 44 having a plurality of circumferentially spaced slots 46 provided in the upper end thereof as viewed in FIG. 3 and extending from the top 48 downwardly through a preselected distance whereby any corner or intersection of the strips 38 and 40 may be inserted within the slots 46 and forced to a position engaging the bottom or end of the slots 46. A rod or post member 50 extends longitudinally through the sleeve 44 and is slidable with respect thereto. The post 50 is provided with an enlarged head portion 52 (FIG. 2) at one end thereof for facilitating securing of the post 50 to the panel 18 as will be hereinafter set forth. The post 52 extends beyond the upper or outer end 48 of the sleeve 44 and a pair of spaced washers or flanges 53 and 54 are slidably disposed thereon. A suitable helical spring 56 is disposed around the post 50 and interposed between the washers 53 and 54 for constantly uring the washers in opposite directions. The movement of the washer 53 in one direction is limited by engagement with the intersecting strips 38 and 40, and the movement of the washer 54 in on direction is limited by a knob member 58 which is suitably rigidly secured to the outer end of the post 50.

The post 50 extends through the plate 30 as clearly shown in FIG. 2, with the head portion 52 engaging the plate 30 in such a manner as to retain the post 50 against movement in one direction, and the plate member 28 retaining the post against movement in an opposite direction. The sleeve 44 rests on the inwardly directed face of the plate 30, and the cellular structure 36 is maintained in position in the slots 46 by the force of the spring 56. The spring 56 constantly urges the washers in opposite directions, and since the washer 54 cannot move outwardly on the post 50, the pressure of the spring 56 acts on the washer 53 and thus constantly urges the cellular member 36 in a tight engagement with the slots 46, and maintains the intersecting strips 38 and 40 in a full engagement in the slots 46.

The egg crate 36 is secured to the panel 18 by a plurality of the support members 42, with the supports being spaced as desired or required. It will be readily apparent that substantially all shadows between the cellular structure 36 and the panel 18 are thus eliminated. Furthermore, the unslotted end of the sleeve 44 which rests against the surface of the plate 30 may be inwardly tapered, as slightly indicated at 60 in FIG. 2, to further reduce any undesired shadow pattern on the panel 18.

Substantially any number of light bulbs 62 may be removably secured to the cellular structure 36 as required to produce the desired light pattern on the panel 18. Whereas the bulbs 62 may be secured to the structure 36 in any suitable manner, the means depicted herein comprises a spring clip member 64 adapted to snap over the upper edge of any strip 38 or 40. The outer end of the clip 64 terminates in a flange member 66 disposed in substantial planar alignment with the plane determined by the composite edges of the strips 38 and 40. The flange 66 supports a bayonet type housing 68 which, in turn, receives the light bulb 62. The bulb 62 is thus supported within one of the cells 41, and of course, the flange 66 also supports the usual terminals, or the like (not shown) for facilitating the electrical connection (not shown) of the bulb with the electrical wiring system (not shown) of the panel 18. A bulb may be thus disposed in substantially any of the cells 41, as required for the desired lighting pattern for the panel 18.

The egg crate structure 36 will be spaced from the plane of the panel 30 by a distance substantially equal to the length of the unslotted portion of the sleeves 44 which are supporting the structure 36 on the panel 18. Of course, the light emitting from each bulb 62 will be directed toward the panel 18 and will illuminate the area without interruption and without shadow patterns being cast by the structure of the egg crate 36 on the face of the panel 18. It is frequently found that the heat from the bulbs 62 on the panel 18 causes the panel 18 to warp or become distorted, which interferes with the efficient use of the illustrative material on the panel. In order to reduce or substantially preclude distortion of the panel 18 from the heat of the bulbs, a plurality of posts 63 may be utilized. The posts 63 are preferably of a substantially square or rectangular configuration, as particularly shown in FIG. 3, and are provided with recesses 65 and 67 on two converging or intersecting faces thereof. The recesses 65 and 67 are of a width substantially equal to the width of the strips 38 and 40, and the overall dimensions of the posts 63 are preferably smaller than the internal dimensions of the cell 41. A post 63 may be inserted in any cell 41 and secured therein by placing two intersecting strips 38 and 40 within the notches or recesses 65 and 67 of the posts 63. Of course, the posts 63 are preferably disposed behind or in alignment with opaque portions of the panel 18 in order to preclude disturbance of the lighted illustrative portions, and the posts 63 may be disposed at substantially any desired spacing as required for firmly supporting the panel 18 for precluding distortion thereof. It may also be preferable to apply a suitable cement to the engaging surfaces of the panel 18 and posts 63 for facilitating securing of the panel 18 to the post. It is found that the cement may be readily broken or overcome by relatively slight manual pressure applied in an appropriate direction, as is well known, when it is desired to remove a post 63 or change the position thereof. Alternatively, the post 63 may be secured to the panel 18 by means of a screw 69, or the like (FIG. 2) if desired, in lieu of the cement. Of course, the post 63 may be of substantially any desired configuration rather than the square or rectangular configuration depicted herein.

Figure 4:
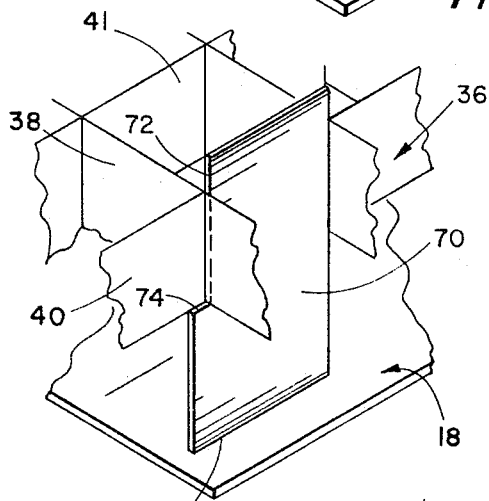
FIG. 4 is a broken perspective view of a display panel and cellular element ilustrating one type of light dam.

When it is necessary to channel the direction or flow of the light or eliminate the passage of light from some area on the panel 18, it is desirable to provide light dams for interrupting the flow of the light. By way of example, a single light dam 70 is depicted in FIG. 4 which consists of a substantially rectangular plate member having a length slightly greater than the width of a strip 38 (or a strip 40) plus the distance between the panel 18 and egg crate 36. A substantially L-shaped notch 72 is provided on one side edge of the plate 70 and extends longitudinally therealong in order to provide a shoulder 74 spaced from one end 76 of the plate 70 a distance substantially equal to the distance between the egg crate 36 and the panel 18. The width of that portion of the plate 70 coterminous with the slot 72 is substantially equal to the spacing between adjacent strips 38 (or adjacent strips 40) whereby the dam 70 may be inserted within any cell 40 in such a manner that the plate 70 rests against the selected side of the cell 41 and the structure 36 rests upon the shoulder 74. The edge 76 of the dam 70 will rest on the surface of the plane 18 and preclude passage of light beyond the dam itself. The dam is held in position by the closeness of the fit thereof within the cell 41, and that portion of the dam 70 which extends outwardly above or from the cell 41 facilitates manual installation or removal of a dam from a cell 41.

Figure 5:
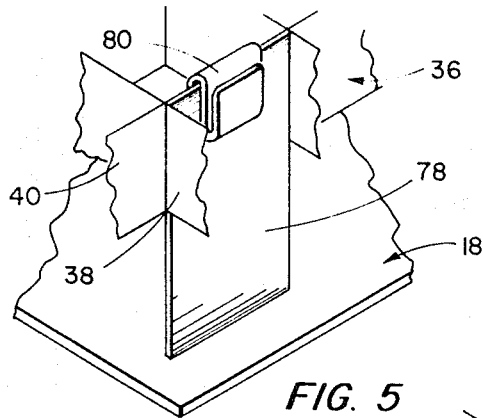
FIG. 5 is a view similar to FIG. 4 depicting a modified light dam.

A similar single light dam 78 is depicted in FIG. 5 and comprises a substantially rectangular plate of a width substantially equal to the distance between adjacent pairs of strips 38 (or strips 40) and of a length substantially equal to the width of a strip 38 (or a strip 40), plus the distance between the panel 18 and the egg crate 36. The dam 78 may be disposed within a cell 41 and adjacent the selected side wall thereof, and a spring clip 80 may be utilized for a snapping engagement between the side wall of the cell 41 and the plate 78 for securely retaining the dam in place but permitting easy removal of any engagement thereof.

Figure 6:
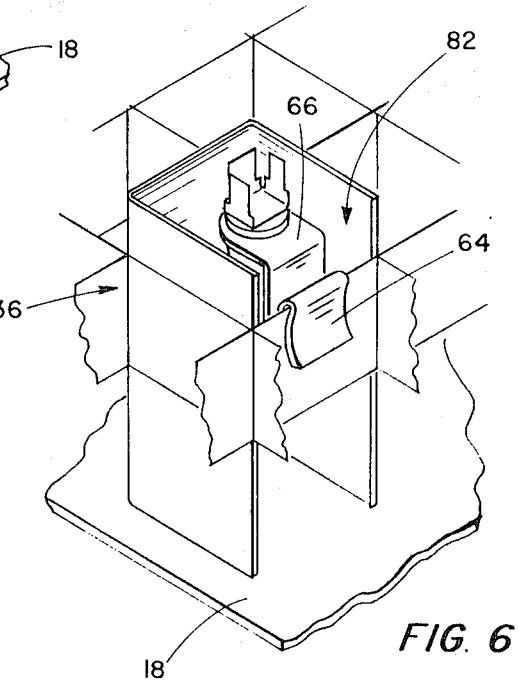
FIG. 6 is a broken perspective view of a panel and cellular element embodying the invention and illustrating still another modified light dam and light bulb in combination therewith.

FIG. 6 illustrates a three sided light dam 82 disposed within a cell 41 in combination with a snap clip 64 which supports a bulb 62 as hereinbefore set forth. The light dam 82 is of a three sided substantially rectangular (or square) cylindrical configuration with the dimensions of each of the three sides thereof being substantially equal to or slightly less than the internal dimensions of the cell 41. The overall length of the light dam 82 is at least as great as the width of the strips 38 (or strips 40) and the distance between the structure 36 and the panel 18 and is preferably slightly greater than the combined length as clearly shown in FIG. 6. The dam 82 may be manually inserted within any preselected cell 41, such as a cell having a light 62 secured therein. The dam 82 may be so positioned as to dam or preclude the passage of light in three directions while permitting the flow of light in the fourth direction, as well as through the panel 18 in an area substantially equal to the cell 41 as bound by the three sides of the cell 82.

Figure 8A:
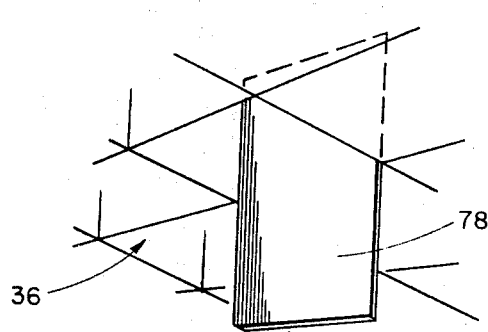
FIGS. 8A through 8F are broken perspective views of light dam members of varying configuration in combination with a cellular structure as may be used in the invention.
Figure 8B:
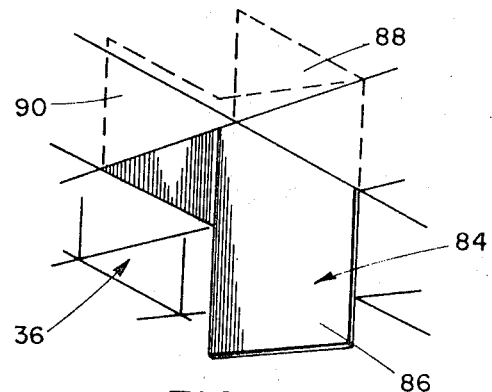
Figure 8C:
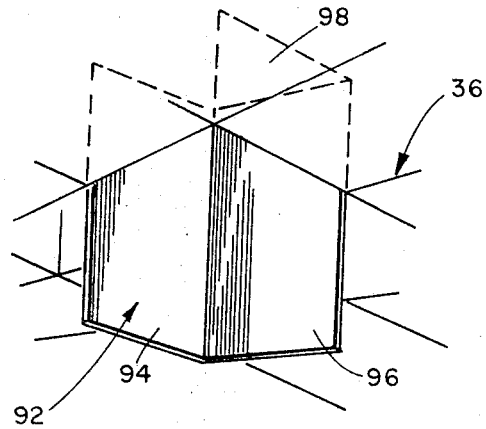

Referring to FIGS. 8A through 8F, a plurality of light dams such as may be utilized in the invention is depicted as installed within an egg crate structure 36. By way of example, FIG. 8A further illustrates the single dam 78 hereinbefore set forth. FIG. 8B illustrates a single type dam structure 84 which comprises a main dam light portion 86 substantially corresponding in size and configuration with the dam 78. A pair of side arms or plates 88 and 90 are provided on the opposite edges of the plate 86 and extend from one end thereof through a distance substantially equal to the width of a strip 38 (or a strip 40). The length of the arms 88 and 90 is preferably substantially equal to the internal dimensions of the cell 41 whereby the dam 84 may be manually inserted into a cell 41 with the plate portion 86 disposed adjacent the panel 18, and the arms 88 and 90 in frictional engagement with the opposite side walls of the cell 41 for retaining the dam 84 in place. A dam 92 is shown in FIG. 8C which comprises a pair of perpendicularly arranged substantially rectangular walls 94 and 96. The wall 96 is further provided with an outwardly extending arm 98 along one side edge thereof with the arm 98 being of a depth or width substantially equal to the width of a strip 38 (or a strip 40) and being disposed parallel to and spaced from the wall 94. The dam 92 may be inserted within any cell 41 as desired and the frictional engagement of the walls 94 and 96 and arm 98 with the inner periphery of the cell 41 retains the dam in position against the panel 18.

Figure 8D:
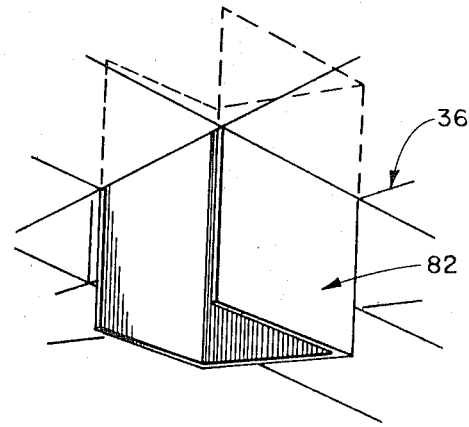
Figure 8E:
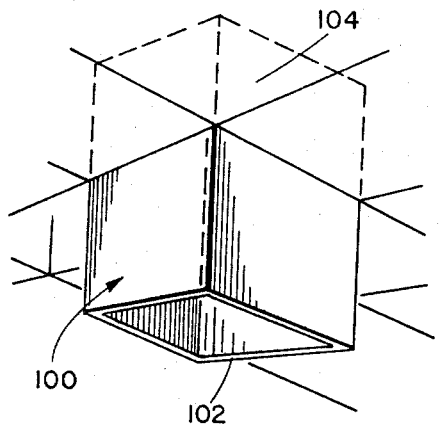

FIG. 8D is a further illustration of the three sided dam 82 with the bulb 62 being eliminated for purposes of clarity. FIG. 8E illustrates a light dam 100 which is of a substantially square or rectangular tubular configuration. The dam 100 is of a sufficient length as to be inserted within a cell 41 in such a manner that the end 102 thereof may be disposed adjacent the panel 18, and the upper portion 104 thereof as viewed in FIG. 8E is disposed within the cell 41 in such a manner that the walls of the square tube 100 frictionally engage the inner periphery of the cell 41 for retaining the dam 100 in position. Of course, a bulb 62 may be secured within the cell 41 and dam 100 in the manner as hereinbefore set forth, and the walls of the dam 100 will channel the light from the bulb 62 directly through the portion of the panel 18 in the proximity of the end 102 of the dam 100 with the four walls of the dam 100 precluding any flow of the light in lateral directions.

Figure 8F:
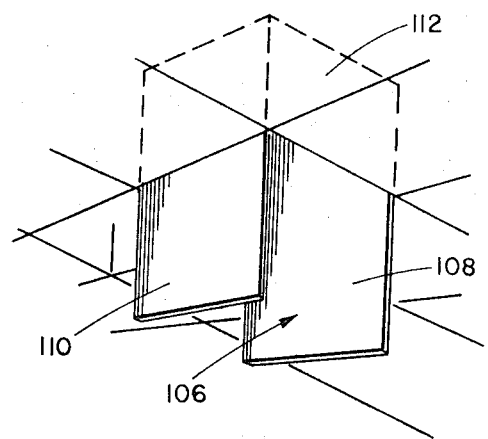

FIG. 8F depicts a light dam 106 comprising a pair of oppositely disposed mutually parallel side plates or legs 108 and 110 extending longitudinally from a substantially square tube portion 112. The square tube portion 112 is preferably of a size substantially corresponding to the inner periphery of the cell 41 whereby the dam 106 may be inserted within substantially any cell 41 and retained therein by the frictional engagement between the tube portion 112 and the inner periphery of the cell. It will be apparent that a light bulb 62 inserted within the dam 106 will cast light through the panel 18 and in two lateral directions only as channeled by the plane members 108 and 110 resting against the panel 18. The proper number, style or type, and placement of light dams within cells 41 may be arranged in order to adapt the egg crate or cellular structure 36 for the desired flow or channeling of light for proper illustration of the training panel 10. The egg crate 36 so provided with lights and dams may then be secured to the panel 18 in the manner as hereinbefore set forth. (It is to be noted that whereas the panel 18 depicted herein is a laminated construction, there is no limitation of the method of construction or manner of construction for the panel 18.) The light bulbs may then be electrically wired in any well known manner and operably connected with the control panel 26 whereby the lights may be selectively actuated as required for animation of the training panel illustration. Referring now to FIGS. 9 through 12, a novel insert 114 is shown which is particularly designed and constructed for facilitating the assembly of a lighted illustration panel or training board 10 in an easy and quick manner. The insert 114 generally comprises a substantially square or rectangular tube or sleeve member 116 having the opposite ends thereof open. The sleeve 116 is preferably of a length substantially equal to or slightly greater than the width of a strip 38 or strip 40 and the distance between the egg crate 36 and the panel 18. The sleeve 116 is also preferably of a cross sectional configuration and size complementary to the configuration and size of the inner periphery of the cells 41. Thus, the sleeve 116 may be quickly and easily inserted within substantially any desired cell 41 and may be retained therein by the frictional engagement between the outer periphery of the sleeve 116 and the inner periphery of the cell 41. A substantially square or rectangular insert member 118 is removably secured on one open end of the sleeve 116 in any suitable or well known manner. As shown herein the insert 118 comprises a substantially flat face having tab members 120 provided on each edge thereof and extending substantially perpendicularly therefrom for insertion within the said one open end of the sleeve 116. It is preferable that the insert 118 be so arranged with respect to the sleeve 116 as to be flush with the said one end thereof, thus closing the one end of the sleeve. The closed end is disposed immediately adjacent the inner face of the panel 18.

Figure 9:
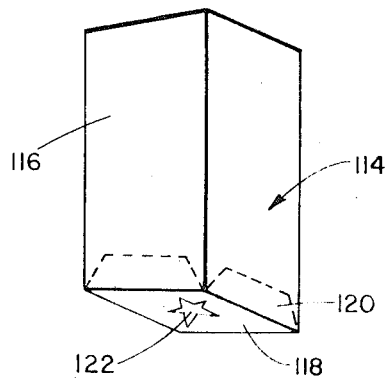
FIG. 9 is a perspective view of an illustration insert member embodying the invention.
Figure 10:
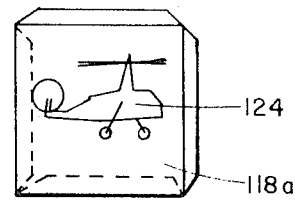
FIG. 10 is a plane view of a removable end member such as may be used with an illustration insert.
Figure 11:
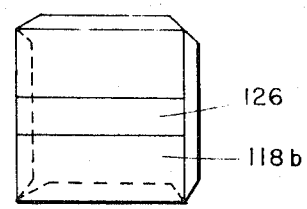
FIG. 11 is a view similar to FIG. 10 of another removable end member which may be utilized with an illustration insert.
Figure 12:
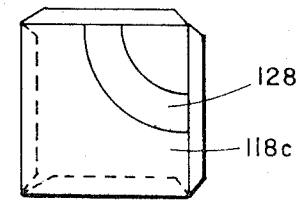
FIG. 12 is a view similar to FIG. 10 depicting still another removable end for an illustration insert.

The insert member 118 is of a substantially opaque construction and only those portions thereof are transparent as required for transmitting light therethrough in accordance with the desired light pattern for the panel 18. For example, as shown in FIG. 9, a transparent star 122 may be provided in the insert 118 with the remaining portions thereof being opaque. Thus, a light bulb disposed within the sleeve 116 will cast a light which will be emitted only through the star shaped portion 122. Thus, the light pattern on the panel 18 will be of a star shaped configuration. As shown in FIG. 10, a helicopter 124 may be of transparent condition on the otherwise opaque insert 118a. In this instance, light will be emitted only through the configuration of the helicopter and thus a lighted helicopter shape will be cast or shown upon the panel 18. It will be readily apparent that substantially any design or pattern may be provided on the inserts 118 in order to build or construct a pattern of light on the panel 18. By way of further example, FIGS. 11 and 12 relate to insert patterns which might be utilized in constructing an electrical circuit pattern or a highway system on a lighted illustration or panel. A plurality of inserts 118b may be provided with a transparent bar 126 extending thereacross with the remaining portions thereof opaque. It will be apparent that a plurality of sleeves 116 provided with inserts 118 disposed in side by side relationship would result in an elongated bar of light extending across the panel 18. In any position wherein it is desired to provide a perpendicularly arranged bar of light, the insert 118b may be secured in the sleeve 116 in a position at right angles to that shown in FIG. 11. At a position wherein it is desired to provide a curved corner connecting a pair of perpendicularly arranged light bars, an insert member such as shown at 118c may be utilized. The insert 118c is provided with a substantially quarter circle or arcuate transparent portion 128. It will be apparent that substantially any pattern of an electrical wiring circuit or a highway system, or the like, may be readily conducted by the assembly of the proper style and number of inserts 118 and sleeves 116 in the circular structure 36.

From the foregoing it will be apparent that the present invention provides a novel back lighted panel structure particularly designed and constructed for eliminating undesirable shadows on the lighted illustration surface of the panel and for substantially precluding warping or distortion of the panel. In addition, dams for channeling the light flow onto the panel are provided which may be easily and quickly installed, or removed and replaced as required. Furthermore, insert members are provided which permit the ready assembly of a complete illustration or lighted display system in a manner not heretofore possible.

Whereas the present invention has been described in particular relation to the drawings attached hereto, it should be understood that other and further modifications, apart from those shown or suggested herein, may be made within the spirit and scope of this invention.

What is claimed is:

1. A back lighted display device comprising a translucent panel, a cellular structure spaced from said panel and provided with a plurality of cells having at least one open end, spacer means cooperating between the cellular structure and panel for supporting the cellular structure in said spaced relation with respect to the panel in a manner substantially precluding casting of shadows on the panel, light bulb means removably secured within preselected cells, light channeling means removably secured within preselected cells in association with preselected light bulb means, and support post means secured between the cellular structure and panel for substantially precluding distortion of the panel, and said spacer means comprising a sleeve member removably secured between the panel and cellular structure, and yieldable means cooperating between the cellular structure and sleeve member for maintaining the cellular structure in said spaced relation with respect to the panel.

2. A back lighted display device as set forth in claim 1 wherein the yieldable means comprises a rod member extending through the panel and sleeve and beyond the cellular member, spaced flange members slidably disposed on the rod member and spaced from the sleeve member whereby the first of said flange members engages the cellular structure opppositely disposed from the sleeve member, spring means interposed between the flange members, stop means secured to the outer end of the rod member for engagement of the second of said flange members wherein the force of the spring constantly urges the first flange member into engagement with the cellular structure and urges the cellular structure into engagement with said sleeve member.

3. A back light display device comprising a translucent panel, a cellular structure spaced from said panel and provided with a plurality of cells having at least one open end, spacer means cooperating between the cellular structure and panel for supporting the cellular structure in said spaced relation with respect to the panel in a manner substantially precluding casting of shadows on the panel, light bulb means removably secured within preselected cells, light channeling means removably secured within preselected cells in association with preselected light bulb means, and support post means secured between the cellular structure and panel for substantially precluding distortion of the panel, said support post means comprising a post member secured to the panel, said post member being provided with recess means for removably receiving a cell member therein whereby said cellular structure may be secured to the panel in such a manner as to substantially preclude said distortion of the panel.

References Cited

UNITED STATES PATENTS

| | | | |
|---|---|---|---|
| 1,662,704 | 3/1928 | Herrschaft | 40—133 |
| 1,720,441 | 7/1929 | Rivkin | 40—28C |
| 1,747,400 | 2/1930 | Stewart et al. | 40—133XB |
| 1,759,291 | 5/1930 | Atkinson | 40—132D |
| 2,952,079 | 9/1960 | Koch | 35—1 |
| 3,025,613 | 3/1962 | Mitchell | 35—49 |
| 3,040,444 | 6/1962 | Koch | 35—1 |
| 3,194,954 | 7/1965 | Locke | 35—1X |
| 3,362,063 | 1/1968 | Joselevich | 40—28C |

FOREIGN PATENTS 1,301,826  7/1962  France.

ROBERT W. MICHELL, Primary Examiner

R. CARTER, Assistant Examiner

U.S. Cl. X.R.

40—28C; 35—1